(12) United States Patent
Jin et al.

(10) Patent No.: US 11,385,207 B2
(45) Date of Patent: Jul. 12, 2022

(54) METHOD AND SYSTEM FOR ANALYSIS OF ADDITIVES IN WATER-BASED POLYMER SAMPLE

(71) Applicant: LG CHEM, LTD., Seoul (KR)

(72) Inventors: Mi Kyoung Jin, Daejeon (KR); Rin Jang, Daejeon (KR); So Yeon Kim, Daejeon (KR); Byoung Hyoun Kim, Daejeon (KR); Bumgyu Choi, Daejeon (KR)

(73) Assignee: LG CHEM, LTD., Seoul (KR)

( * ) Notice: Subject to any disclaimer, the term of this patent is extended or adjusted under 35 U.S.C. 154(b) by 148 days.

(21) Appl. No.: 17/015,489

(22) Filed: Sep. 9, 2020

(65) Prior Publication Data

US 2021/0116424 A1 Apr. 22, 2021

(30) Foreign Application Priority Data

Oct. 16, 2019 (KR) .................. 10-2019-0128141
Jul. 30, 2020 (KR) .................. 10-2020-0094860

(51) Int. Cl.
*G01N 30/14* (2006.01)
*G01N 30/84* (2006.01)
*G01N 30/72* (2006.01)

(52) U.S. Cl.
CPC ......... *G01N 30/14* (2013.01); *G01N 30/7206* (2013.01); *G01N 30/84* (2013.01); *G01N 2030/143* (2013.01); *G01N 2030/8405* (2013.01)

(58) Field of Classification Search
CPC .... G01N 30/14; G01N 30/7206; G01N 30/84; G01N 2030/143; G01N 2030/8405; G01N 2030/885
See application file for complete search history.

(56) References Cited

FOREIGN PATENT DOCUMENTS

| JP | 6-50954 A | 2/1994 |
|---|---|---|
| JP | 2000-131300 A | 5/2000 |
| JP | 2018-163068 A | 10/2018 |
| KR | 10-2017-0114533 A | 10/2017 |
| KR | 10-1816288 B1 | 1/2018 |
| WO | WO-2018030709 A1 * | 2/2018 ............... G01N 1/38 |

OTHER PUBLICATIONS

Frank Cheng-Yu Wang, "Polymer Additive Analysis By Pyrolysis-Gas Chromatography IV. Antioxidants", J. Chrmatogr A., vol. 891, Issue. 2, pp. 325-336.

* cited by examiner

*Primary Examiner* — Jennifer Wecker
*Assistant Examiner* — Michael Paul Shimek
(74) *Attorney, Agent, or Firm* — Dentons US LLP

(57) ABSTRACT

The present disclosure provides a method for analyzing an additive in a water-based polymer sample, comprising the steps of: (S1) putting the water-based polymer sample containing a polymer, the additive, and water as a solvent into a vial; (S2) putting a porous pouch containing a superabsorbent polymer (SAP) into the vial to absorb the water into the superabsorbent polymer; (S3) removing the porous pouch from the vial and collecting the concentrated polymer sample remaining in the vial; and (S4) performing a pyrolysis gas chromatography (Py-GC)/mass spectrometer (MS) analysis by introducing the concentrated polymer sample to the Py-GC/MS.

11 Claims, 4 Drawing Sheets

[FIG. 1]
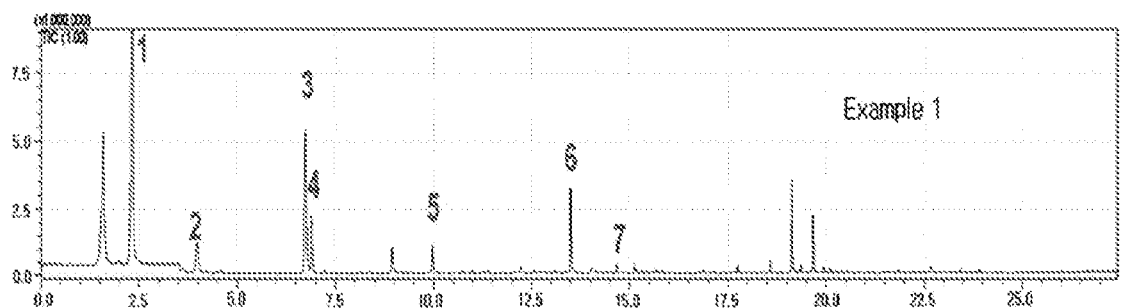
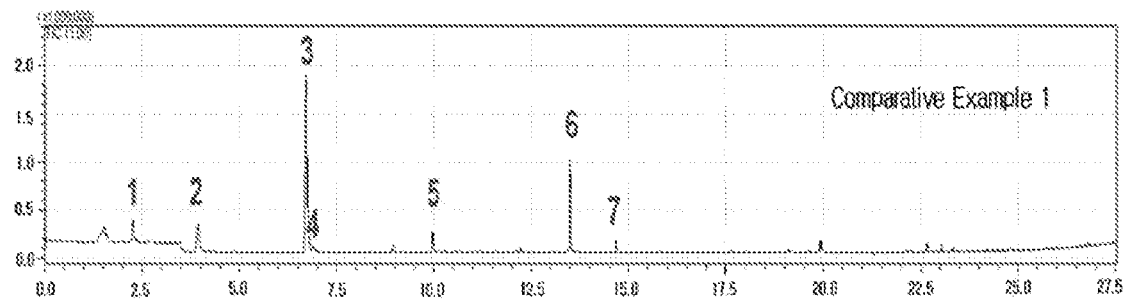
1: Butyl alcohol (derived from BA), 2: 2-ethyl-1-hexene (derived from 2-EHA or 2-EHMA), 3: Styrene, 4: BA
5: 2-ethyl-1-hexanol (derived from 2-EHA or 2-EHMA), 6: 2-EHA, 7: 2-EHMA

[FIG. 2]
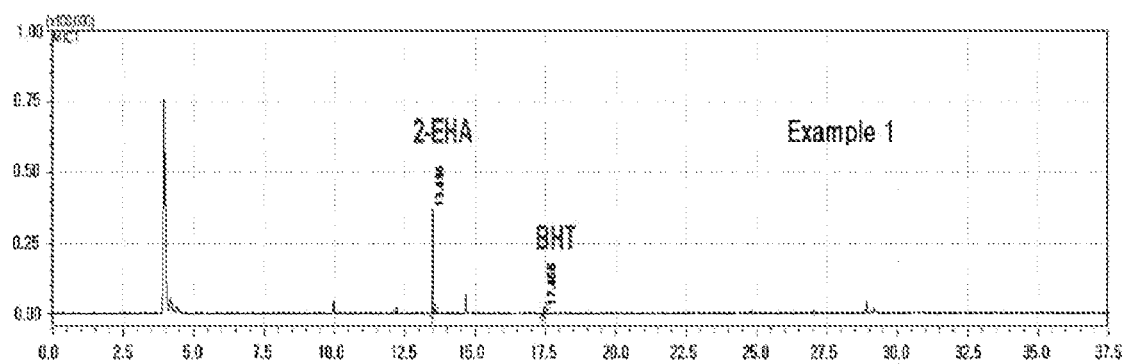
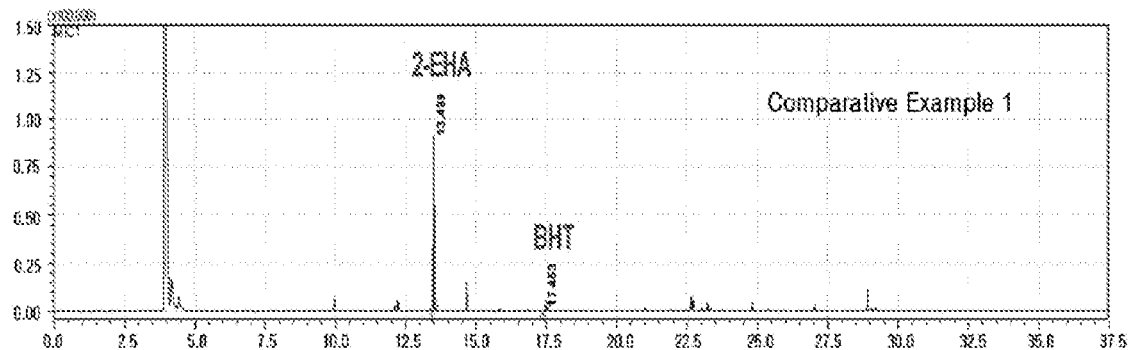

[FIG. 3]
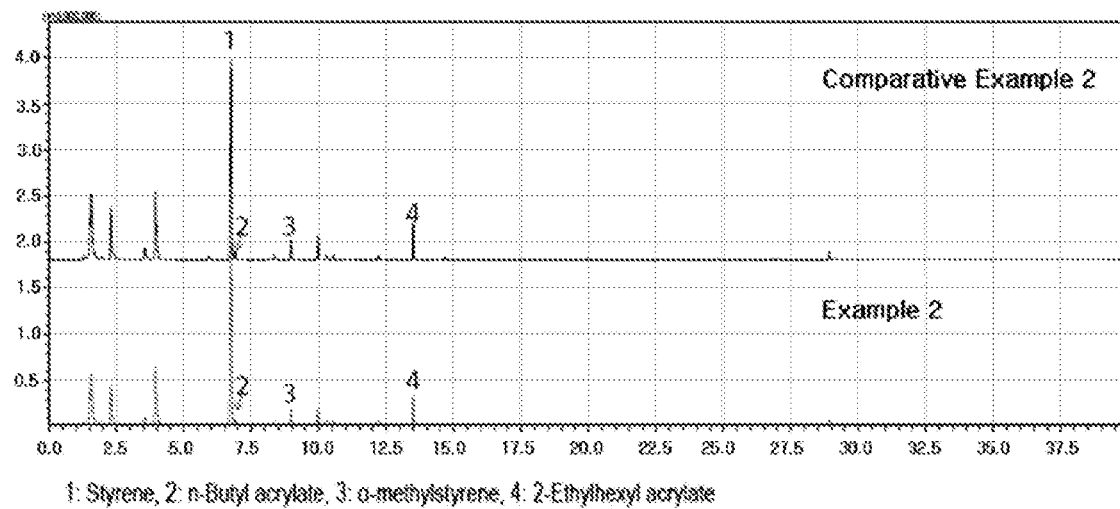
1: Styrene, 2: n-Butyl acrylate, 3: α-methylstyrene, 4: 2-Ethylhexyl acrylate
[FIG. 4]
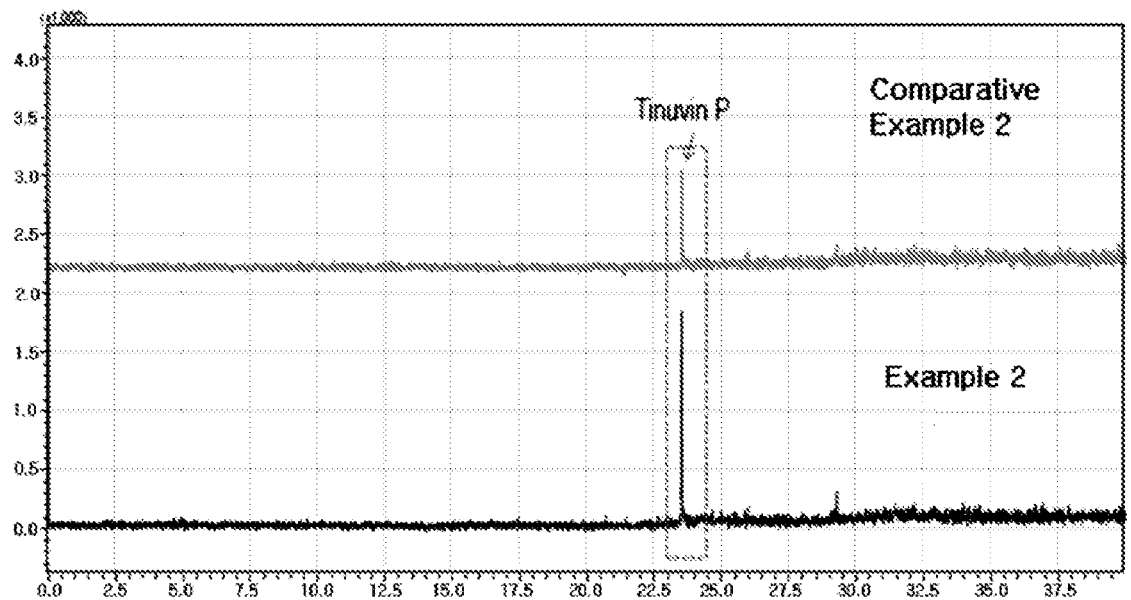

[FIG. 5]
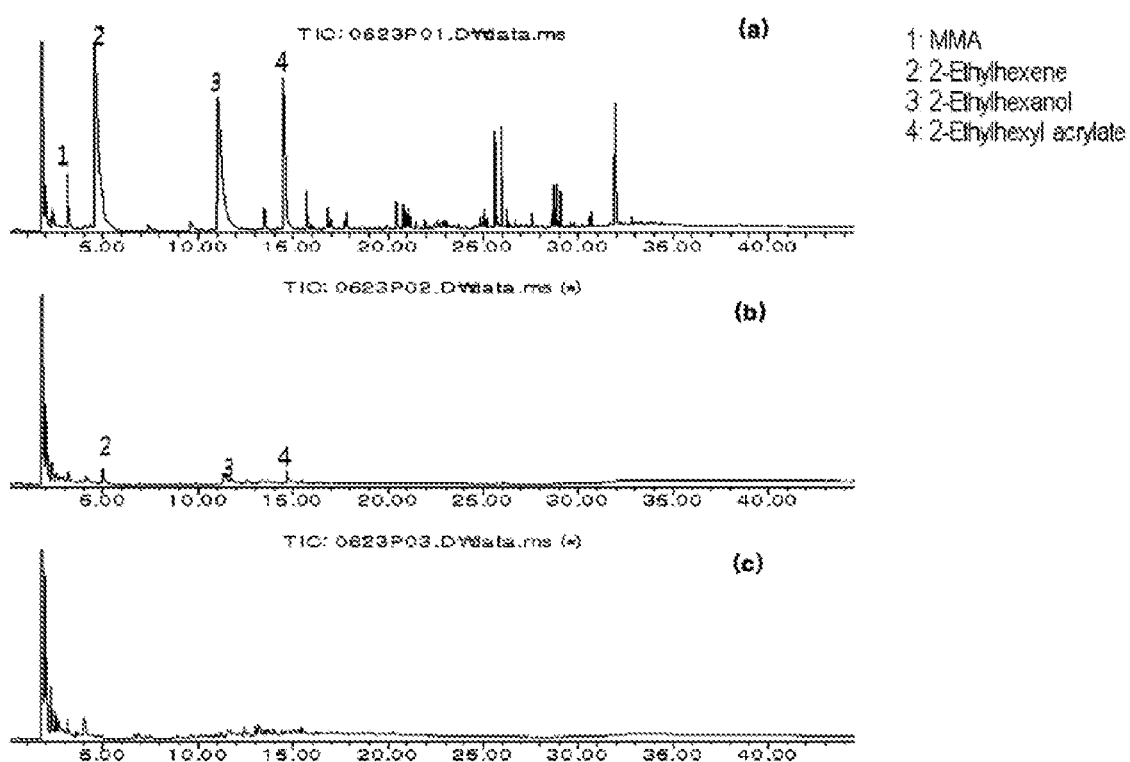

METHOD AND SYSTEM FOR ANALYSIS OF ADDITIVES IN WATER-BASED POLYMER SAMPLE

TECHNICAL FIELD

This application claims the benefit of priority based on Korean Patent Application No. 10-2019-0128141 filed on Oct. 16, 2019 and Korean Patent Application No. 10-2020-0094860 filed on Jul. 30, 2020, and all contents disclosed in the patent document are incorporated as a part of this specification.

The present invention relates to a method and a system for analysis of additives in a water-based polymer sample, and more particularly to an analysis method comprising a pre-treatment of a water-based polymer sample using a superabsorbent polymer.

BACKGROUND OF THE INVENTION

A polymer may be prepared from a polymer composition containing one or more monomers and additives, wherein the additives may include a polymerization initiator, a coupling agent, and a crosslinking agent. Those additives function to improve a stability or a physical property of the polymer in their small amount. Since the additives can critically affect the final performance of the polymer, qualitative and quantitative analysis of the additives is required.

A method used to analyze components of the polymer comprises extracting and concentrating the components contained in the polymer with an appropriate extraction manner, and then analyzing them using an analysis device. Examples of the extraction include a liquid-liquid extraction, a liquid-solid extraction, a solvent extraction, a reprecipitation extraction, and the like.

These extraction use a solvent, which may cause a change in the concentration of the sample during the extraction process or a loss and contamination of the sample during the drying process for concentration. For example, in case of a water-based polymer sample, a process of drying the sample by a nitrogen purging ($N_2$ purging) after raising a temperature to remove water from the sample has been used, but there are disadvantages that volatile additives of a low molecular weight may be lost during this process and the analysis time becomes longer because it takes several hours to dry.

SUMMARY OF THE INVENTION

Accordingly, in order to settle the above disadvantages of the prior art, the present invention is to provide a method and system for analyzing volatile additives of a low molecular weight contained in a sample without loss quickly and accurately by efficiently removing water in a water-based polymer sample in a short time.

An aspect of the present invention provides a method for analyzing additives in a water-based polymer sample, comprising the steps of:

(S1) putting the water-based polymer sample containing a polymer, the additives, and water as a solvent into a vial;

(S2) putting a porous pouch containing a superabsorbent polymer (SAP) into the vial to absorb the water with the superabsorbent polymer;

(S3) removing the porous pouch from the vial and collecting the concentrated polymer sample remaining in the vial; and (S4) performing a pyrolysis gas chromatography (Py-GC)/mass spectrometer (MS) analysis by introducing the concentrated polymer sample to the Py-GC/MS.

Further, the present invention provides a system for applying the above analysis method, the analytical system comprising;

a vial for accommodating a sample solution containing a polymer, additives and water as a solvent;

a porous pouch that can be accommodated into the vial and contains a superabsorbent polymer; and a pyrolysis gas chromatography (Py-GC)/mass spectrometer (MS).

Furthermore, the present invention provides a computer-readable recording medium in which a program for executing the above analysis method is recorded.

Effect of the Invention

According to the present invention, a water-based polymer sample containing additives is subject to pre-treatment of removing water therefrom using a superabsorbent polymer (SAP) contained in a porous pouch, followed by performing a Py-GC/MS analysis on the polymer sample concentrated by the pre-treatment, thereby allowing the quick and accurate analysis of volatile additives of a low molecular weight contained in a polymer sample without loss thereof.

BRIEF DESCRIPTION OF THE DRAWINGS

FIGS. 1 to 5 show results of a Py-GC/MS analysis on components in a water-based polymer sample according to Examples of the present invention and Comparative Examples.

DETAILED DESCRIPTION

Hereinafter, the terms or words used in these specification and claims should not be construed to be limited to conventional or dictionary meanings, but to be meanings and concepts consistent with the technical idea of the present invention based on the principle that the inventor can properly define the concepts of the terms so as to best explain his/her own invention.

An embodiment of the present invention relates to a method for analyzing additives in a water-based polymer sample, comprising a pre-treatment of the water-based polymer sample using a superabsorbent polymer (SAP). Hereinafter, the above method will be described step by step.

The present invention is to analyze the water-based polymer sample. Specifically, the water-based polymer sample containing a polymer, the additives, and water as a solvent is prepared and putted into a vial (step S1).

As long as the vial can accommodate a liquid sample, a shape and material thereof may be used without any particular limitation.

The polymer contained in the sample is a compound obtained by polymerization of one or more monomers. Examples of the monomers may include butyl acrylate, styrene, 2-ethylhexyl acrylate, 2-ethylhexyl methacrylate, and the like. In addition, the polymer may have a molecular weight of 5,000 to 5,000,000 g/mol.

The additives are used in a small amount upon polymerization of the polymer to improve a stability or a physical property of the polymer, and may include a volatile compound having a low molecular weight of 50 to 700 g/mol. Examples of such additives may include butylated hydroxytoluene (BHT), Tinuvin P, or a mixture thereof.

Further, the sample may contain an inorganic material that functions as a filler or an insulating material, if necessary, wherein the inorganic material may include, for example, an inorganic oxide such as alumina and titania, or an inorganic hydroxide.

In order to remove water contained in the sample, a porous pouch containing the superabsorbent polymer (SAP) is putted into the vial containing the sample to absorb the water with the superabsorbent polymer (step S2).

The superabsorbent polymer (SAP) is made by partially crosslinking a water-soluble polymer, and is a polymer having a three-dimensional network structure and a large amount of hydrophilic groups. For example, it may be obtained by polymerizing an acrylic acid monomer, a neutralizing agent, a foaming agent, a polymerization initiator and a crosslinking agent.

Such SAP shows both of a water insolubility and a hydrophilicity so that it can absorb a large amount of water without being dissolved in water. In addition, the superabsorbent polymer may be in the form of a powder, a bead, a fiber, etc., and the superabsorbent polymer becomes a gel form while greatly swelling out of the initial shape thereof if it absorbs water.

If the pre-treatment of absorbing and removing water contained in the water-based polymer sample is carried out using the superabsorbent polymer, the analysis time can be shortened and a loss of components contained in the sample can be minimized by concentrating the polymer sample simply and applying it to the analysis directly, compared to the existing pre-treatment method of drying the sample by a nitrogen purging ($N_2$ purging) after raising a temperature to remove water from the sample upon analysis of the water-based polymer sample.

For example, if a pouch containing the superabsorbent polymer is putted into a vial which is then shaken for about 5 seconds to 2 minutes, the water in the sample can be sufficiently absorbed into the superabsorbent polymer at a room temperature, and this absorbing process does not require to dry under the nitrogen, thereby minimizing a loss of the components such as volatile additives of a low molecular weight.

The porous pouch has a pore structure in such a size that the superabsorbent polymer does not escape, and it is sufficient if the pore has a small size of ½ or less of an average particle diameter of the superabsorbent polymer. For example, the average particle diameter of the superabsorbent polymer may be 100 to 30,000 μm, specifically 300 to 2,000 μm, and more specifically 500 to 1,500 μm, and the pore size of the porous pouch may be 250 μm or less, specifically 150 μm or less, and more specifically 50 μm or less.

After water is absorbed into the superabsorbent polymer, the porous pouch is removed from the vial and a concentrated polymer sample remaining in the vial is collected (step S3).

If the superabsorbent polymer is putted into the vial directly without using the porous pouch, the superabsorbent polymer containing acrylic monomer components is not properly separated and may remain together with the polymer sample in the vial, which may result in being difficult to obtain accurate results in the analysis process.

Subsequently, the concentrated polymer sample is introduced into a pyrolysis gas chromatography (Py-GC)/mass spectrometer (MS) to perform the Py-GC/MS analysis (step S4).

In this step, the pyrolysis of the concentrated polymer sample may be performed at a constant temperature in the range of 400 to 800° C., for example, 500 to 600° C., without raising the temperature. In addition, a temperature of an inlet in the Py-GC/MS analysis device may be adjusted to a constant temperature in the range of 250 to 350° C., for example, 300 to 320° C.

In the GC analysis, a column as a fixed phase may be used without any particular limitation as long as it is used for the GC/MS analysis. For example, a length (L) of the column may be in the range of 10 to 100 m, an inner diameter (ID) thereof may be in the range of 0.18 to 0.53 mm, and a material to be coated may be variously applied from a siloxane group to a PEG group.

Further, while the sample passes through the column upon the GC analysis, a temperature in the column may be adjusted to a starting temperature of 50 to 100° C. and a heating rate of 10 to 50° C./min using an oven capable of performing a temperature control program. If the temperature in the column is lower than the above range, the analysis time may be longer, and if it exceeds the above range, the sample may be deformed due to excessive temperature application, which may impair the function of the column.

A flow rate of a moving gas used for moving the sample in the column during the GC analysis may be adjusted in the range of 1 to 5 ml/min, for example, 1 to 2 ml/min, and the moving gas may be helium (He).

According to the process as described above, the additive components of a low molecular weight which are volatile due to the low molecular weight in the polymer sample can be analyzed without loss quickly and accurately, by performing the Py-GC/MS analysis of the concentrated polymer sample that is obtained by absorbing and removing water from the water-based polymer sample containing the additives using the superabsorbent polymer (SAP) contained in the porous pouch. For example, according to the present invention, the additives in the polymer sample can be detected about 2.3 to 2.5 times more than the conventional method that uses heating and nitrogen drying.

Further, the present invention provides an analytical system for applying the analysis method as described above, the analytical system comprising: a vial for accommodating a sample containing the polymer, the additives and water as a solvent; a porous pouch that can be accommodated into the vial and contains the superabsorbent polymer; and a pyrolysis gas chromatography (Py-GC)/mass spectrometer (MS).

In the above analytical system, the descriptions of constitutions overlapping with those of the above analysis method are the same with each other.

Further, the present invention provides a computer-readable recording medium in which a program for executing the analysis method is recorded.

Hereinafter, the following Examples will be described in detail to help understanding of the present invention. However, the Examples according to the present invention may be modified in widely various forms, and the scope of the present invention should not be construed to be limited to the Examples. The Examples of the present invention are provided to more fully explain the present invention to those who have an average knowledge in the art.

EXAMPLE 1

A water-based polymer composition comprising a polymer containing butyl acrylate (BA), styrene, 2-ethylhexyl acrylate (2-EHA) and 2-ethylhexyl methacrylate (2-EHMA) as a monomer, an alumina as an inorganic material, and water as a solvent was prepared. To the polymer composition was added BHT (butylated hydroxytoluene) having a molecular weight of 220.36 g/mol as an additive to obtain a sample solution, and then the sample solution was putted into a glass vial.

A porous pouch (pore size: 100 μm) containing a superabsorbent polymer (SAP) in a powder form having a particle diameter of about 150 μm was putted into the vial, and the vial was shaken for about 5 seconds to sufficiently absorb water into the superabsorbent polymer. The pouch of the superabsorbent polymer into which water was absorbed was removed from the vial, and the concentrated polymer sample attached to a wall of the vial was collected.

For Py-GC/MS analysis of the collected sample, 5020AS (CDS) and GCMS-QP2010 ultra (Shimadzu) were used. Pyrolysis was carried out by heating the collected sample under an inert condition at 600° C. for 10 seconds, thereby obtaining a fragment. The GC/MS analysis was performed by using Ultra Alloy +−5 (30 mL×0.25 mm I.D, 0.25 μm d.f., capillary) as a column and flowing a helium (He) as a moving gas at a rate of 1 ml/min. The sample was maintained at an inlet temperature of 300° C. and a column temperature of 50° C. for 5 minutes, and then heated at a rate of 10° C./min, and maintained at 300° C. for 10 minutes.

<Structure of BHT>

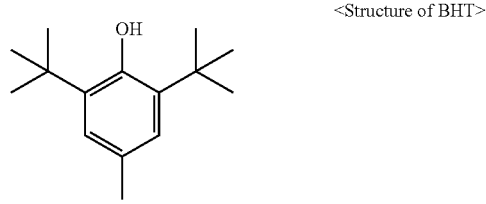 [SMILES: Cc1cc(C(C)(C)C)c(O)c(C(C)(C)C)c1]

COMPARATIVE EXAMPLE 1

Purging with $N_2$ Gas Instead of Using SAP

The sample solution of the water-based polymer used in Example 1 was putted into a glass vial and purged with $N_2$ gas while heating to 60° C. to remove water (it has taken about 3 hours). Subsequently, the sample attached to a bottom of the vial was collected, and Py-GC/MS analysis was performed under the same conditions as in Example 1.

EXAMPLE 2

The same procedure as that of Example 1 was performed, except that a water-based polymer composition (CR-366, BASF) containing styrene, n-butyl acrylate, α-methylstyrene and 2-ethylhexyl acrylate as a monomer was prepared and Tinuvin P having a molecular weight of 225.25 g/mol was mixed to the polymer composition to obtain a sample solution.

<Structure of Tinuvin P>

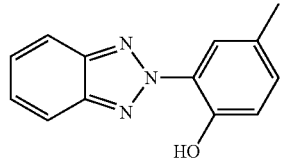

COMPARATIVE EXAMPLE 2

Purging with $N_2$ Gas Instead of Using SAP

The same procedure as that of Comparative Example 1 was performed using the water-based polymer sample prepared by Example 2.

EXAMPLE 3

The same procedure as that of Example 1 was performed, except that a water-based polymer composition containing methyl methacrylate (MMA) and 2-ethylhexyl acrylate (2-EHA) as a monomer was prepared and butylated hydroxytoluene (BHT) having a molecular weight of 220.36 g/mol was mixed to the polymer composition to obtain a sample solution.

3030D (Frontierlab) and GCMS-7890B/5977A (Agilent) were used for Py-GC/MS analysis of a collected sample. Pyrolysis was performed by heating the sample to 600 under an inert condition, thereby obtaining a fragment. The GC/MS analysis was performed by using Ultra Alloy +−5 (30 mL×0.25 mm I.D, 0.25 μm d.f., capillary) as a column and flowing a helium (He) as a moving gas at a rate of 1 ml/min. The sample was maintained at an inlet temperature of 300° C., and a column temperature of 50° C. for 5 minutes, and then heated at a rate of 10° C./min and maintained at 300° C. for 13 minutes.

COMPARATIVE EXAMPLE 3

No Use of Porous Pouch

A water-based polymer composition containing methyl methacrylate (MMA) and 2-ethylhexyl acrylate (2-EHA) as a monomer is prepared, and butylated hydroxytoluene (BHT) having a molecular weight of 220.36 g/mol was mixed to the polymer composition to obtain a sample solution, and then the sample solution was putted into a glass vial.

After a superabsorbent polymer (SAP) in a powder form having a particle diameter of about 150 μm was putted into the vial directly without using a porous pouch, water was sufficiently absorbed into the superabsorbent polymer for about 5 seconds. The superabsorbent polymer into which water was absorbed was removed from the vial, and a concentrated polymer sample attached to a wall of the vial was collected.

3030D (Frontierlab) and GCMS-7890B/5977A (Agilent) were used for Py-GC/MS analysis of the collected sample. Pyrolysis was performed by heating the sample to 600 under an inert condition, thereby obtaining a fragment. The GC/MS analysis was performed by using Ultra Alloy +−5 (30 mL×0.25 mm I.D, 0.25 μm d.f., capillary) as a column, and flowing a helium (He) as a moving gas at a rate of 1 ml/min. The sample was maintained at an inlet temperature of 300° C. and a column temperature of 50° C. for 5 minutes, and then heated at a rate of 10° C./min, and maintained at 300° C. for 13 minutes.

Comparing Example 1 and Comparative Example 1, and Example 2 and Comparative Example 2, each of which has the analysis target identical with each other, the pre-treatment processes of Examples 1 and 2 that removed water using the superabsorbent polymer took about 5 seconds, whereas the pre-treatments of Comparative Examples 1 and 2 that removed water by heating and nitrogen purging took about 3 hours.

Meanwhile, FIG. 1 shows results of the Py-GC/MS analysis on the components in the water-based polymer sample according to Example 1 and Comparative Example 1, and FIG. 2 shows analysis results of the BHT as the additive based on 2-EHA among the components identified in FIG. 1. Table 1 below exhibits the results of FIG. 2 as concrete numeral values.

TABLE 1

|  | Component | Retention time (R.T, min) | GC/MS EIC area | Area rate (%) |
|---|---|---|---|---|
| Example 1 | 2-EHA(m/z 112) | 13.496 | 58020 | 93.87 |
|  | BHT(m/z 205) | 17.455 | 3786 | 6.13 |
|  | BHT/2-EHA |  |  | 0.065 |
| Comparative Example 1 | 2-EHA(m/z 112) | 13.499 | 140796 | 97.25 |
|  | BHT(m/z 205) | 17.453 | 3974 | 2.75 |
|  | BHT/2-EHA |  |  | 0.028 |

As can be seen from FIG. 2 and Table 1, Example 1 performing the pre-treatment that removes water using the superabsorbent polymer indicated that the GC/MS EIC (area) value of BHT relative to 2-EHA was detected more than 2.3 times as compared to Comparative Example 1 performing the nitrogen purging. This means that a loss of the BHT was minimized upon the pre-treatment with the superabsorbent polymer.

Similarly, FIG. 3 shows results of the Py-GC/MS analysis on the components in the water-based polymer sample according to Example 2 and Comparative Example 2, and FIG. 4 shows analysis results of Tinuvin P as the additive based on BA among the components identified in FIG. 3. Table 2 below exhibits the results of FIG. 4 as specific numeral values.

TABLE 2

|  | Component | Retention time (R.T, min) | GC/MS EIC area | Area rate (%) |
|---|---|---|---|---|
| Example 2 | BA(m/z 73) | 6.8 | 378807 | 99.05 |
|  | Tinubin P(m/z 225) | 23.7 | 3645 | 0.95 |
|  | Tinubin P/BA |  |  | 0.0096 |
| Comparative Example 2 | BA(m/z 73) | 6.8 | 345465 | 99.62 |
|  | Tinubin P(m/z 225) | 23.7 | 1308 | 0.38 |
|  | Tinubin P/BA |  |  | 0.0038 |

As can be seen from FIG. 4 and Table 2, Example 2 performing the pre-treatment that removes water using the superabsorbent polymer indicated that the GC/MS EIC (area) value of Tinuvin P relative to BA was detected more than 2.5 times as compared to Comparative Example 2 performing the nitrogen purging. This means that a loss of Tinuvin P was minimized upon the pre-treatment with the superabsorbent polymer.

Meanwhile, FIG. 5 shows comparison of Example 3 and Comparative Example 3 that have the same analysis target with each other, but use or fail to use the porous pouch. Specifically, FIG. 5(a) shows a result of performing the pyrolysis of the sample according to Example 3 in which water was removed from the porous pouch containing the SAP, FIG. 5(b) shows a result of performing the pyrolysis of the sample according to Comparative example 3 without using the porous pouch, and FIG. 5(c) shows a result of performing the pyrolysis of the SAP itself.

In FIG. 5(a) showing the result of Example 3, the peaks of each monomer were clearly separated and analyzed, whereas in FIG. 5(b) showing the result of Comparative Example 3 without using the porous pouch, the peak was not clearly separated, which results from putting the SAP into the vial directly without using the porous pouch.

What is claimed is:

1. A method for analyzing additives in a water-based polymer sample, comprising the steps of:
   (S1) putting the water-based polymer sample containing a polymer, the additives, and water as a solvent into a vial;
   (S2) putting a porous pouch containing a superabsorbent polymer (SAP) into the vial to absorb the water into the superabsorbent polymer;
   (S3) removing the porous pouch from the vial and collecting the concentrated polymer sample remaining in the vial; and
   (S4) performing a pyrolysis gas chromatography (Py-GC)/mass spectrometer (MS) analysis by introducing the concentrated polymer sample to the Py-GC/MS.

2. The method of claim 1, wherein the polymer is obtained by polymerizing one or more monomers selected from butyl acrylate, styrene, 2-ethylhexyl acrylate and 2-ethylhexyl methacrylate.

3. The method of claim 1, wherein the additives include a compound having a molecular weight of 50 to 700 g/mol.

4. The method of claim 2, wherein the additives include BHT (butylated hydroxytoluene), Tinuvin P, or a mixture thereof.

5. The method of claim 1, wherein the superabsorbent polymer has an average particle diameter of 100 to 30,000 μm.

6. The method of claim 1, wherein the porous pouch has a pore size of 250 μm or less.

7. The method of claim 1, wherein the step (S2) is carried out at a room temperature for 5 seconds to 2 minutes.

8. The method of claim 1, wherein the pyrolysis in the step (S4) is carried out at 400 to 800° C.

9. The method of claim 1, wherein the GC analysis in the step (S4) is performed by adjusting a temperature in the column to a starting temperature of 50 to 100° C. and a heating rate of 10 to 50° C./min.

10. An analytical system for applying the analysis method of claim 1, the analytical system comprising;
   the vial for accommodating a sample solution containing the polymer, the additives and the water as a solvent;
   the porous pouch that can be accommodated into the vial and contains the superabsorbent polymer; and
   the pyrolysis gas chromatography (Py-GC)/mass spectrometer (MS).

11. A computer-readable recording medium in which a program for executing the analysis method of claim 1 is recorded.

* * * * *